United States Patent [19]

Biermann

[11] Patent Number: 4,554,825
[45] Date of Patent: Nov. 26, 1985

[54] DAMPING DEVICE OF AN AIR FLOW RATE METER DISPOSED IN THE AIR INTAKE TUBE OF AN INTERNAL COMBUSTION ENGINE

[75] Inventor: Eberhard Biermann, Uhldingen, Fed. Rep. of Germany

[73] Assignee: Robert Bosch GmbH, Stuttgart, Fed. Rep. of Germany

[21] Appl. No.: 585,041

[22] Filed: Mar. 1, 1984

[30] Foreign Application Priority Data

Apr. 29, 1983 [DE] Fed. Rep. of Germany ....... 3315706

[51] Int. Cl.⁴ .......................................... G01M 15/00
[52] U.S. Cl. .................................... 73/118; 73/861.76
[58] Field of Search ............... 73/118, 861.75, 861.76; 123/494

[56] References Cited

U.S. PATENT DOCUMENTS 3,880,125  4/1975  Uammerer et al. ................. 123/494
4,392,386  7/1983  Knetsch et al. .............. 73/118 A X Primary Examiner—Jerry W. Myracle
Attorney, Agent, or Firm—Edwin E. Greigg

[57] ABSTRACT

A damping device of an air flow rate meter disposed in the intake tube of an internal combustion engine, which air flow rate meter serves to damp the effect of intake-tube recoiling upon the air flow rate meter. The damping device includes a guide bushing, which is firmly connected with a bearing shaft of the air flow rate meter and has an outer Thread-like groove. A blocking body provided with a matching inner thread-like groove is rotatable on the guide bushing and is supported such that it is axially displaceable counter to a compression spring in the direction toward a detent body attached to the housing. The detent body and the blocking body have latch protrusions oriented toward one another, which upon an axial movement of the blocking body toward the detent body are capable of meshing with one another and stopping the movement of the air flow rate meter in the event of intake-tube recoiling.

1 Claim, 2 Drawing Figures

DAMPING DEVICE OF AN AIR FLOW RATE METER DISPOSED IN THE AIR INTAKE TUBE OF AN INTERNAL COMBUSTION ENGINE

BACKGROUND OF THE INVENTION

The invention is based on an air flow rate meter disposed in the air intake tube of an internal combustion engine.

An air flow rate meter is already known in which an elastic stop is provided, in order to damp the effect of recoiling air in the intake tube on the air flow rate meter. Then the danger exists, however, that upon an acceleration of the flap of the flow rate meter thus resulting from recoils in the intake tube, such high forces arise that the air flow rate meter becomes partially deformed at the elastic stop and because of this damage is no longer capable of affording the required precision of measurement.

OBJECT AND SUMMARY OF THE INVENTION

The damping device according to the invention has the advantage over the prior art that damage to the air flow rate meter in the event of intake-tube recoiling is prevented.

The invention will be better understood and further objects and advantages thereof will become more apparent from the ensuing detailed description of a preferred embodiment taken in conjunction with the drawing.

BRIEF DESCRIPTION OF THE INVENTION

FIG. 1 is a sectional view taken through an air flow rate meter disposed in the intake tube of an internal combustion engine and having a damping device; and FIG. 2 is a sectional view taken along the line II—II of FIG. 1.

DESCRIPTION OF THE PREFERRED EMBODIMENT

Figure 1:
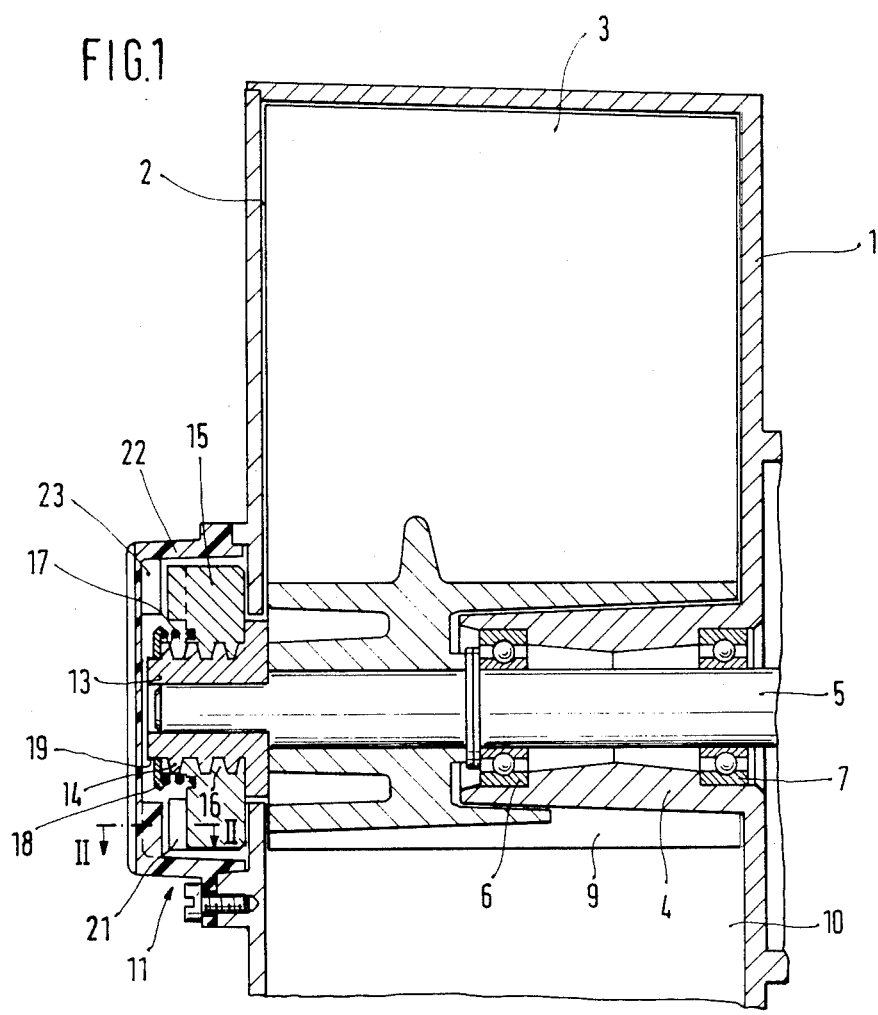

In the air flow rate meter shown by way of example in FIG. 1, the quantity of air aspirated by an internal combustion engine flows via a flow conduit 2, which is embodied in a housing 1 and in which an air flow rate measuring flap 3 is disposed, to the various individual cylinders of the engine, not shown. The air flow rate measuring flap 3 is supported unilaterally in a bearing dome 4 of the housing 1 via a bearing shaft 5 and ball bearings 6, 7. To damp pulsations, a damping flap 9 is connected with the air flow rate measuring flap 3 and is disposed, likewise being pivotable about the bearing shaft 5, in a damping chamber 10. The deflection of the air flow rate measuring flap 3 occurring because of the quantity of air striking it takes place counter to the spring force of a spiral spring engaging the bearing shaft 5 but not shown. The angular positions of the air flow rate measuring flap 3 or of the bearing shaft 5 can be picked up electrically, for instance, by a potentiometer as a standard for the quantity of air flowing therethrough.

Figure 2:
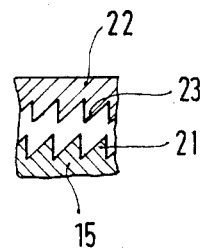

In the case of intake-tube recoiling, relatively high pressures can arise in the intake tube, which can render the system incapable of functioning, for instance from damage to the air flow rate meter. To damp the effect of this recoiling upon the air flow rate meter, a damping device 11 is therefore provided. A guide bushing 13, as part of the damping device 11, is pushed onto the end of the bearing shaft 5 protruding from the housing 1, thus being connected with the bearing shaft 5 in a rotationally fixed manner. The guide bushing 13 has outer helical thread-like groove 14 on its circumference, which is for instance a double left-handed thread-like groove. A blocking body 15 is supported on the guide bushing 13, having inner thread-like grooves 16 associated with the outer thread-like grooves 14 of the guide bushing 13, so that the outer thread-like grooves 14 and the inner thread-like grooves are able to mesh with one another. A compression spring 17 is supported on the surface of the blocking body 15 remote from the housing 1, being supported on the other end on a disk 18, which is supported on the circumference of the guide bushing 13 and rests on a collar 19 of the guide bushing. On the end face remote from the housing 1, the blocking body 15 has latch protrusions 21 (see FIG. 2), associated with which are latch protrusions 23 on a cap-like detent body 22. During normal functioning of the measuring device, an air gap is formed between the latch protrusions 21 and 23; that is, the latch protrusions 21 and 23 are not in engagement with one another. If in the event of intake-tube recoiling a sudden acceleration of the air flow rate measuring flap 3 now occurs in the closing direction, then the blocking body 15 remains in position because of its inertial force, and is then, because of the thread-like grooves 14, 16, axially displaced in the direction toward the detent body 22, so that the latch protrusions 21, 23 come into engagement with one another and the closing movement of the air flow rate meter 3 is interrupted, as a result of which an equalization of pressures is possible at the opened air flow rate measuring flap 3, thus avoiding damage to the air flow rate measuring flap 3.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A damping device for an air flow rate meter disposed in an intake tube of an internal combustion engine, a bearing shaft, means for applying a restoring force on said bearing shaft said air flow rate meter is supported on said bearing shaft and rotated in accordance with a quantity of air flowing through said intake tube counter to a restoring force, a guide bushing connected with one end of said bearing shaft, with thread-like grooves on its circumference, a blocking body provided with inner thread-like grooves that matches said thread like grooves on said bearing shaft, a compression spring supported on said blocking body, said blocking body is rotatable on the guide bushing and is supported such that said blocking body is axially displaceable counter to said compression spring in a direction toward a detent body attached to a housing, said detent body and said blocking body each have latch protrusions oriented toward one another, which upon an axial movement of said blocking body toward the detent body, said latch protrusions mesh with one another to damp said air flow rate meter.

* * * * *